No. 689,705. Patented Dec. 24, 1901.
L. CASTIN.
CAR FENDER.
(Application filed Oct. 18, 1901.)
(No Model.)
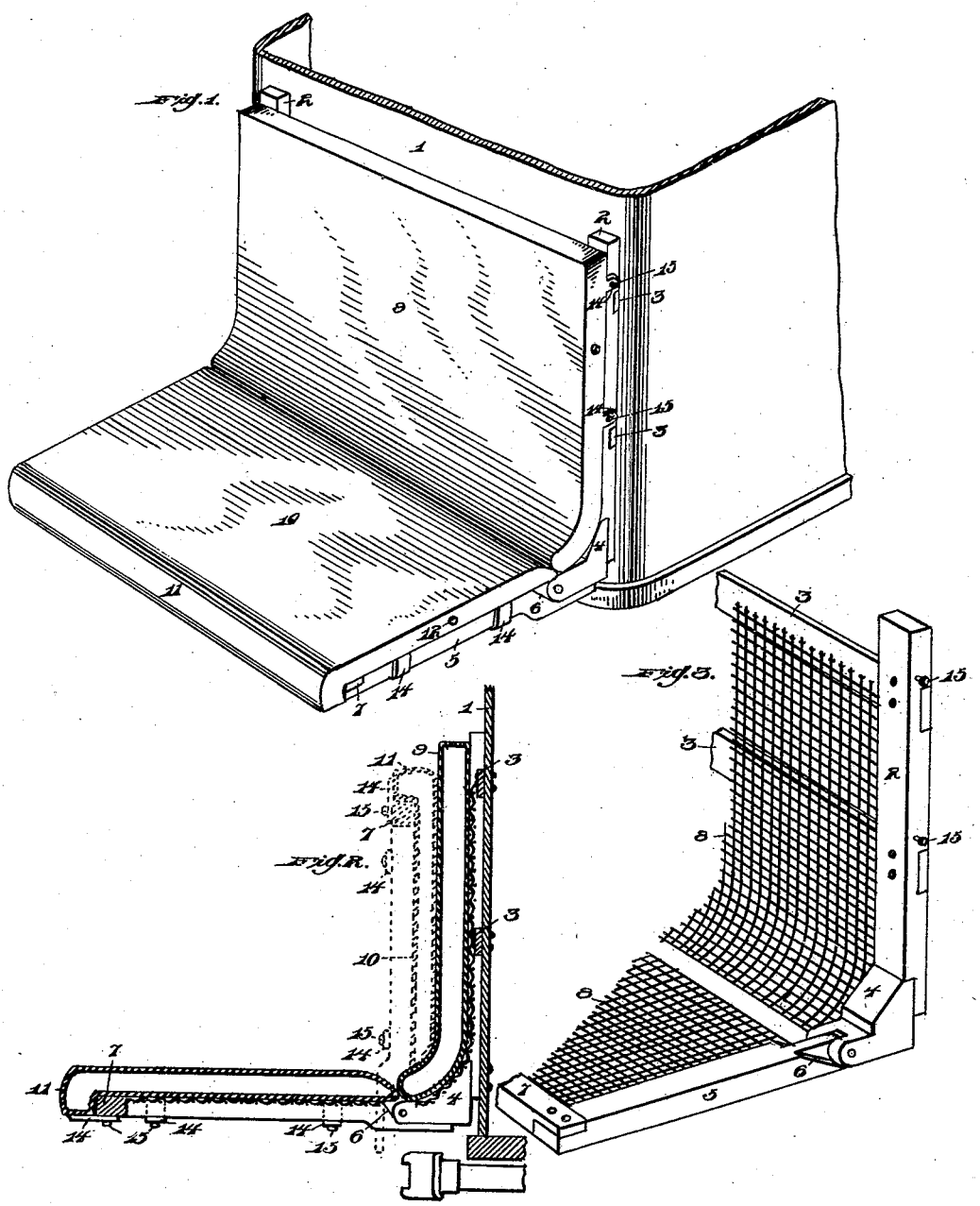
Witnesses:
J. P. Appleman
E. E. Potter
Inventor
Lucien Castin
By
H. C. Evert
Attys

UNITED STATES PATENT OFFICE.

LUCIEN CASTIN, OF NEW KENSINGTON, PENNSYLVANIA.

CAR-FENDER.

SPECIFICATION forming part of Letters Patent No. 689,705, dated December 24, 1901.

Application filed October 18, 1901. Serial No. 79,104. (No model.)

*To all whom it may concern:*

Be it known that I, LUCIEN CASTIN, a citizen of the United States of America, residing at New Kensington, in the county of Westmoreland and State of Pennsylvania, have invented certain new and useful Improvements in Car-Fenders, of which the following is a specification, reference being had therein to the accompanying drawings.
This invention relates to certain new and useful improvements in car-fenders, and relates particularly to that class of car-fenders having an air-cushion secured thereto in such a manner as to prevent injury to the person when struck by the fender.

The invention aims to construct a fender of this class with an air-cushion in two or more sections, so as to permit the ready folding of the fender when desired.
Briefly described, the invention comprises a fender having a stationary upright portion which is adapted to be connected to the dashboard of the car and the folding section adapted to lie normally in the horizontal position in close proximity to the track. A pneumatic or air cushion is provided for each of the sections, these cushions being removably connected to the stationary section or the frame of the fender.
In describing the invention in detail reference is had to the accompanying drawings, forming a part of this specification, and wherein like numerals of reference indicate corresponding parts throughout the several views, in which—

Figure 1 is a detail perspective view of my improved fender attached in position on a car, the latter being broken away. Fig. 2 is a transverse vertical sectional view of the fender attached in position. Fig. 3 is a detail perspective view of a part of the fender-frame, the pneumatic cushions being removed.

To put my invention into practice, I provide a frame which comprises two sections—
the vertical stationary section and a folding section—the vertical stationary section being adapted to be attached rigidly to the dashboard 1 of the car and consists of two end uprights 2, recessed on their rear faces to receive the cross-bars 3, which may be rigidly secured therein by screws or nails, as shown, and the frame thus formed suspended from the car-dashboard by screws or bolts passing into the cross-pieces 3, as shown in Fig. 2, or this frame may be rigidly secured to the car-platform in any suitable manner. At their lower ends the uprights 2 are formed with outwardly-projecting portions 4, which are bifurcated to form a pair of lugs in which the side rails 5 of the folding section of the fender are pivotally supported. The pivotal ends of these side rails 5 are cut away or beveled, as shown at 6, so as to permit the folding of this section of the fender in a vertical position, such as shown in dotted lines in Fig. 2 of the drawings. Cross-bars 7 connect the side rails 5, and the stationary section of the fender, as well as the folding section, is provided with a suitable netting 8, which may be of wire mesh or any other desirable material. The air or pneumatic cushion 9 is provided for the stationary section of the fender, and a like cushion 10 covers the movable section of the fender, this latter cushion having an overhanging forward edge 11, which lies over the front cross-bar 7. These cushions may be filled with air through the ordinary valve 12 in the usual manner. Each of the cushions is provided with lugs 14, which are adapted to button onto the headed pin or studs 15, carried by the fender-frame. The two cushions at their meeting edges are so constructed as not to interfere with each other when folding, this construction being clearly shown in Fig. 2 of the drawings.

With this construction it will be observed that a cheap and efficient form of fender will be provided, and it will be noted that in case a person should be struck by the fender the air or pneumatic cushions will prevent serious injury, and in the practice of the invention it will be observed that various changes may be made in the details of construction without departing from the general spirit of my invention.

Having fully described my invention, what I claim as new, and desire to secure by Letters Patent, is—

1. In a car-fender, the combination of a fender-frame comprising two sections one rigidly secured to the car and the other pivoted to the rigid section, of removable air-cushions for each section, said cushions having lugs adapted to be fastened to the headed pin carried by the frame for securing the cushions in position, substantially as described.

2. A car-fender comprising a rigid and a folding section, the folding section being pivoted to the rigid section with a wire mesh covering each section, combined with a pneumatic cushion for each section, the cushion for the folding section having an overlying front edge, the said cushions being removably secured to the fender-frame, substantially as described.

3. The combination with a car, a rigid fender-section secured thereto and a folding section pivoted to the rigid section, of a pneumatic cushion removably secured to each section, the cushion for the folding section having its front edge overlapping the front bar of the folding section, substantially as described.

In testimony whereof I affix my signature in the presence of two witnesses.

LUCIEN CASTIN.

Witnesses:
A. M. WILSON,
E. E. POTTER.